United States Patent Office 2,743,156
Patented Apr. 24, 1956

2,743,156
URANIUM RECOVERY PROCESS

Max C. Metziger, Alfred Long, and Emil M. Stoltz, Jr., Joliet, Ill., assignors to the United States of America as represented by the United States Atomic Energy Commission No Drawing. Application August 6, 1954, Serial No. 448,401

9 Claims. (Cl. 23—14.5)

This invention relates to a process of recovering uranium values from phosphate rock and more particularly to a process wherein uranium values are separated from a solution of monosodium phosphate which has been derived by suitable treatments of phosphate rock.

A typical phosphate rock used in the manufacture of phosphoric acid and phosphate fertilizers has the following analysis:

| | Percent |
|---|---|
| $P_2O_5$ | 36 |
| CaO | 49 |
| $Fe_2O_3$ | 1 |
| $Al_2O_3$ | 1 |
| $SiO_2$ | 6 |
| $U_3O_8$ | .01 |
| Traces | 3.5 |
| F | 3.5 |

As may be seen from the foregoing analysis, uranium is a minor constituent of phosphate rock, and it may therefore be appreciated that its separation from the other constituents of phosphate rock by a low cost recovery method presents a formidable problem.

This invention has as an object to recover the uranium values from phosphate rock by a commercially feasible process which is relatively low in cost.

A further object is to recover the uranium values of phosphate rock in connection with a process of converting the phosphate values of said phosphate rock into monosodium phosphate.

A still further object is to upgrade the separated uranium values to convert them into a uranium concentrate that can readily be dissolved in nitric acid to form a uranyl nitrate solution which is susceptible of further purification by extraction with suitable organic solvents.

Other objects will appear hereinafter.

These objects are accomplished in accordance with the present invention by carrying out the process generally described in this and the following two paragraphs. Phosphate rock is reacted with sulfuric acid to yield crude phosphoric acid and gypsum. The gypsum is removed by filtration, washed free of soluble phosphates and discarded. The solution is then treated with a suitable oxidizing agent having an oxidation potential more negative than —0.334, in quantity sufficient to produce an oxidation potential in the solution of at least 200–300 millivolts with respect to a calomel electrode. The crude phosphoric acid is neutralized with an alkali such as soda ash or sodium hydroxide to a pH of 3.5 to 4.5, and preferably about 4.0. This neutralization step causes the precipitation of insoluble phosphates of the calcium, aluminum, iron, etc. values, and the conversion of phosphate values remaining in solution to predominantly the $H_2PO_4^-$ ion or a sodium monophosphate solution. The precipitated insoluble phosphates and other solid residue are removed by filtration, preferably with a filter aid.

The aqueous monosodium phosphate liquor which is made in the manner set forth in the preceding paragraph is again filtered to further clarify the solution. To this clarified liquor there is added a suitable reducing agent to reduce and precipitate the uranium values. The reducing agent must have a reduction potential more positive than —0.334, and a quantity is added sufficient to produce in the solution a reduction potential of 400–500 millivolts with respect to a calomel electrode. Sodium hydrosulfite is the preferred agent. The solution is then filtered with the aid of a suitable filter aid such as diatomaceous earth. The aqueous monosodium phosphate liquor from which the precipitated uranium values have been removed is converted to sodium phosphates in the conventional manner.

The precipitated uranium values, which are mixed with filter aid, are then heated with enough sulfuric acid and an oxidizing agent, such as sodium chlorate, to cause the uranium values to go into solution as a soluble uranyl salt. The dissolved uranium values are separated from the filter aid by filtration. The filter aid is recovered for reuse in the process. To the clarified uranium-containing liquor there is added an alkali such as a strong soda ash solution until a pH of 3.00 to 3.50, and preferably 3.15 to 3.30, is reached. This causes essentially all of the uranium to precipitate. This precipitated uranium phosphate is separated by filtration, washed free of soluble salts, and then dried in an oven.

The following examples illustrate, but do not limit, the invention.

Example I

The aqueous monosodium phosphate solution used was obtained from phosphoric acid which had been oxidized with sodium peroxide to convert the uranium values dissolved therein to the hexavalent or uranyl state. This oxidation step served to decrease the amount of uranium which was lost by precipitation when the phosphoric acid was neutralized with soda ash to produce monosodium phosphate. The monosdium phosphate liquor analyzed 40.9 milligrams of $U_3O_8$ per liter. To each liter of this liquor there were added 0.6 gram of sodium hydrosulfite ($Na_2S_2O_4$) and 0.5 gram of a diatomaceous earth filter aid. This addition at 60° C. resulted in the formation of a uranium- and filter aid-containing precipitate which analyzed 5.88% in $U_3O_8$. Silica comprised 80% of the precipitate and this was attributed to the diatomaceous earth filter aid. The $U_3O_8$ content of this precipitate was calculated to be 29.3% when the amount of the siliceous filter aid occurring in the precipitate was deducted from the total weight of the precipitate to ascertain the actual amount of precipitate formed from the solution. The barren liquor obtained by filtering off this precipitate contained only 0.8 mg. of $U_3O_8$ per liter, which indicated that 98% of the uranium values were recovered in the precipitate.

Example II

Phosphate rock was ground and then leached with 25% $H_2SO_4$. The resultant crude phosphoric acid containing minute amounts of uranium values was oxidized with chlorine to convert the uranium values dissolved therein to the uranyl state. About 2.4 pounds of chlorine per 1000 gallons of acid were used to accomplish this oxidation. This oxidized acid was neutralized with soda ash to a pH of 3.5 to 4.5 to obtain an aqueous solution of monosodium phosphate which was thereupon filtered and further clarified by a second filtration. This clarified solution contained 46.2 mg. of $U_3O_8$ per liter. At a temperature of 60° C. there was added thereto 0.4 g. of $Na_2S_2O_4$ and 0.5 g. of diatomaceous earth filter aid for each liter of solution. This addition resulted in the formation of a uranium- and filter aid-containing precipitate which analyzed 6.69% in $U_3O_8$. This precipitate was calculated to analyze 27.6% in $U_3O_8$ if one disregarded the filter aid present therein. The barren liquor obtained by filtering off this precipitate contained 3.7 mg. of $U_3O_8$ per liter which indicated that 91.8% of the uranium values were recovered in the precipitate.

In one modification of the process an upgrading step is added to the process. In this step the uranium-containing solution obtained by dissolving the $Na_2S_2O_4$ reduced uranium values precipitate in warm sulfuric acid solution is oxidized with a suitable oxidizing agent such as $Na_2O_2$, $Cl_2$, $H_2O_2$, $KMnO_4$, $Na_2Cr_2O_7$, or preferably $NaClO_3$ because of its inexpensiveness and ease of handling. A uranium phosphate precipitate is then formed in the solution by neutralization with an alkali, for example $NH_4OH$. The precipitate is separated from the solution and then redissolved in a sulfuric acid-oxidizing agent solution to complete the upgrading step. This may be repeated several times if desired. The following example illustrates this upgrading step.

*Example III*

To a monosodium phosphate liquor containing 35.6 mg. of $U_3O_8$ per liter there was added 0.5 g. per liter of sodium hydrosulfite and 0.5 g. per liter of filter aid. The resulting precipitate cake analyzed 5.92% in $U_3O_8$ and contained 96.6% of the uranium values of the liquor. The uranium in this precipitate cake was dissolved by heating said precipitate cake at about 90° C. in 5% sulfuric acid in the presence of hydrogen peroxide. The filtered residue—mostly filter aid—retained 0.09% $U_3O_8$. The filtrate was reduced with sodium hydrosulfite and neutralized with ammonium hydroxide to a pH of 4. The precipitate thus obtained analyzed 63.7% in $U_3O_8$, and the filtrate contained 5.4 mg. of $U_3O_8$ per liter. An over-all recovery of 98.6% of the uranium values was obtained in the upgrading step.

As indicated above in Examples I and II, it is important to oxidize the uranium values dissolved in phosphoric acid to the hexavalent state to prevent the formation and loss by precipitation of insoluble uranium compounds when the phosphoric acid is neutralized to form a solution of monosodium phosphate. The importance of this oxidation step was clearly revealed in a 20-day test in which the amount of uranium in a clarified monosodium phosphate solution which had been obtained by neutralization of regular plant phosphoric acid was compared with the amount of uranium in a clarified monosodium phosphate solution which had been obtained by neutralization of regular plant phosphoric acid that had previously been oxidized by adding 2.4 pounds of chlorine to each 1000 gallons of said phosphoric acid. After clarification the monosodium phosphate solution derived from unoxidized plant phosphoric acid contained an average of 57% of the uranium values that were originally present in the phosphoric acid, while an average of 43% of these uranium values were lost in the filter residue. By way of contrast, after clarification the monosodium phosphate solution derived from the chlorinated plant phosphoric acid contained an average of 87% of the uranium values that were originally present in the phosphoric acid, while an average of only 13% of these uranium values were lost in the filter residue. In other words, chlorinating the phosphoric acid prevented about 30% of the uranium values contained therein from being lost in the filter residue which was obtained by clarifying the monosodium phosphate solution.

The oxidation-reduction potential for the +4 and +6 states in acid solutions, which are the ones of interest in the present process, is given for the following equation.

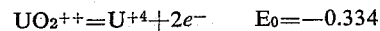
$$UO_2^{++} = U^{+4} + 2e^- \quad E_0 = -0.334$$

Suitable oxidation agents are therefore agents which have a negative oxidation potential more negative than −0.334, and which do not form precipitates in the solution. It is also desirable that they be inexpensive and easily handled. Chlorine and $H_2O_2$ are such agents which are suitable for the first oxidation step in the present process and, from the cost standpoint, chlorine is preferred. The oxidation of the values in the solution is followed with a standard calomel electrode-pH meter type instrument and it has been found that oxidation is complete upon reaching a meter reading of 200 to 300 millivolts.

Sodium hydrosulfite has been found to be the preeminent reducing agent for causing uranium values to precipitate from an aqueous solution of monosodium phosphate. Other reducing agents which have been tried, such as hydrogen sulfide, sodium sulfide, sodium sulfite, sodium metabisulfite, sodium thiosulfate, stannous chloride, sodium oxalate, aluminum, copper, magnesium, metallic sodium, zinc, and finely divided iron, are suitable but fail to give as consistently good recoveries of uranium. Such reducing agents as hydrogen sulfide, sodium sulfide, and sodium sulfite, however, may be used as preliminary reducing agents doing 80–90% of the necessary reduction, and the final 10–20% of the reduction is accomplished with sodium hydrosulfite. Where only a small amount of sodium hydrosulfite is employed, little or no saving results from the use of two reducing agents. However, in instances where use of large amounts of sodium hydrosulfite is necessary for reduction, it may be economical to use two reducing agents; e. g., sodium metabisulfite to do the initial major reduction and a small amount of sodium hydrosulfite to accomplish final reduction and precipitation of the uranium values.

The addition of 0.1–0.2 g. of sodium hydrosulfite per liter of the aqueous monosodium phosphate solution is generally adequate to secure complete reduction and good precipitation of the uranium values contained therein.

These precipitated uranium values will redissolve if if the solution becomes oxidized. Therefore, turbulent mixing of the solution which causes the introduction of air thereinto should be avoided after the sodium hydrosulfite has been added, and the precipitated uranium should be separated from the solution by filtration soon after the precipitate forms and before the solution has had a chance to become reoxidized. Sodium hydrosulfite is generally added as a dry feed since aqueous solutions thereof decompose rapidly. However, it has been found that 15% aqueous solutions of sodium hydrosulfite can be stabilized by using sodium carbonate (approximately 25% of the weight of the sodium hydrosulfite) and by keeping the solution from coming into contact with the air. It has been found that a sulfuric acid solution with a strength of 2.5% is adequate to dissolve the uranium values from the initial uranium-containing precipitate. The following oxidizing agents have been successfully used with sulfuric acid to dissolve the uranium values from the initial precipitate: potassium permanganate, sodium dichromate, hydrogen peroxide, sodium peroxide, chlorine, sodium hypochlorite, potassium persulfate, and sodium chlorate. Because of cost and ease of handling, sodium chlorate was chosen as the most desirable oxidizing agent in this dissolution step. The solution is usually warmed to about 60° C to aid in the dissolution.

Suitable filter aids, such as diatomaceous earth, and asbestos fiber, are used to aid in the clarification of the monosodium phosphate liquor after it is formed and in the filtration of the uranium-containing precipitate that forms when sodium hydrosulfite is added. When diatomaceous earth is used as the filter aid, about 0.25 g. per liter of liquor is used to promote clarification and about 0.35 g. per liter of liquor is used to aid in the separation of the uranium-containing precipitate by filtration. In both the clarification and filtration operations about 1.5 cubic feet of cake form for every 10,000 gallons of liquor that are filtered. Filter aid which is separated from the uranium-containing precipitate in the upgrading process described above in Example III is recycled for reuse. Some of the recycled filter aid is again used to promote filtration of the uranium-containing precipitate while the rest of it is used to aid in the clarification of the monosodium phosphate liquor. Uranium that might be lost due to poor washing in the upgrading process will thus be recovered.

The analysis of a typical precipitate obtained following the initial sodium hydrosulfite reduction is as follows:

| | Weight percent |
|---|---|
| $U_3O_8$ | 5 |
| $SiO_2$ [1] | 70 |
| $P_2O_5$ | 9.9 |
| $Al_2O_3$ | 2.6 |
| $Fe_2O_3$ | 1.3 |
| CaO | 5.5 |
| MgO | 0.7 |
| $V_2O_5$ | 0.7 |
| $TiO_2$ | 0.1 |
| F | 0.14 |
| L. O. I. [2] | 4.3 |

[1] The silica content is attributable to the diatomaceous earth filter acid.
[2] Loss on ignition.

The above description and examples are intended to be illustrative only and not to limit the scope of the invention. Any departure therefrom which conforms to the spirit of the invention is intended to be included within the scope of the appended claims.

What is claimed is:

1. A process for recovering uranium values from a crude phosphoric acid solution which comprises treating the solution with an oxidizing agent in quantity sufficient to produce an oxidation potential in the solution of 200–300 millivolts with respect to a calomel electrode, neutralizing the solution with an alkali to a pH of 3.5–4.5 whereby a first precipitate is formed, separating the precipitate from the solution, treating the solution with a reducing agent in quantity sufficient to produce in the solution a reduction potential of 400–500 millivolts with respect to a calomel electrode, whereby a second precipitate is formed, separating the precipitate from the solution, dissolving the precipitate in an aqueous sulfuric acid solution in the presence of a second oxidizing agent, neutralizing the solution with an alkali to a pH of 3.0–3.5 whereby a uranium phosphate-containing precipitate is formed, and separating said precipitate from the solution.

2. A process for recovering uranium values from phosphate rock, which comprises reacting the phosphate rock with an aqueous sulfuric acid solution, separating the resultant calcium sulfate and residue from the solution, treating the solution with a first oxidizing agent in quantity sufficient to produce an oxidation potential in the solution of 200–300 millivolts, neutralizing the solution with an alkali to a pH of 3.5–4.5 whereby a first precipitate is formed, separating the precipitate from the solution, contacting the solution with a reducing agent in quantity sufficient to produce in the solution a reduction potential of 400–500 millivolts, whereby a second precipitate is formed, separating the precipitate from the solution, dissolving the precipitate in an aqueous sulfuric acid solution in the presence of a second oxidizing agent, neutralizing the solution with an alkali to a pH of 3.0–3.5 whereby a uranium phosphate-containing precipitate is formed, and recovering said uranium phosphate precipitate from the solution.

3. The process of claim 2 wherein the first oxidizing agent is chlorine.

4. The process of claim 2 wherein the first oxidizing agent is $H_2O_2$.

5. The process of claim 2 wherein the reducing agent is sodium hydrosulfite.

6. The process of claim 2 wherein the reducing agent is sodium hydrosulfite and sodium metabisulfite.

7. The process of claim 2 wherein the second oxidizing agent is dichromate.

8. The process of claim 2 wherein the second oxidizing agent is sodium chlorate.

9. A process for recovering uranium values from phosphate rock, which comprises reacting the phosphate rock with an aqueous sulfuric acid solution, separating the resultant calcium sulfate and residue from the solution, treating the solution with chlorine in quantity sufficient to produce an oxidation potential in the solution of 200–300 millivolts, introducing a filter aid into the solution, neutralizing the solution with soda ash to a pH of approximately 4.0 whereby a precipitate is formed, separating the precipitate from the solution by filtration, clarifying the solution by a second filtration, introducing a filter aid into the solution, treating the solution with sodium hydrosulfite in quantity sufficient to produce in the solution a reduction potential of 400–500 millivolts whereby a precipitate is formed, separating the precipitate from the solution by filtration, dissolving the precipitate in an aqueous 2.5% sulfuric acid solution in the presence of sodium chlorate, introducing a filter aid into the solution, neutralizing the resultant solution to a pH of 3.15–3.30 with soda ash whereby a uranium phosphate-containing precipitate is formed and separating the precipitate from the solution.

No references cited.